(Model.)

S. F. SMITH.
Breeching Lifter for Harness.

No. 237,414.            Patented Feb. 8, 1881.

Witnesses:            Inventor:
Arthur M. Sidney            Stewart F. Smith
Charles H. Brown            per Jason W. Firestone
                                                     Atty.

UNITED STATES PATENT OFFICE.

STEUART F. SMITH, OF GAHANNA, OHIO.

BREECHING-LIFTER FOR HARNESS.

SPECIFICATION forming part of Letters Patent No. 237,414, dated February 8, 1881.

Application filed September 27, 1880. (Model.)

*To all whom it may concern:*

Be it known that I, STEUART F. SMITH, a citizen of the United States, residing at Gahanna, in the county of Franklin and State of Ohio, have invented certain new and useful Improvements in Breeching-Lifters for Harness, of which the following is a specification.

The object of my invention is to construct harness so that the breeching can be more easily and readily adjusted to fit any sized horse, give to harness a more elegant appearance, avoid the inconvenience of buckles, buckle straps and loops, and breeching stay-straps on the breeching, and hip-straps, make harness less injurious and better adapted to horses, and lessen the cost of constructing harness.

My invention consists in a breeching-lifter for harness by the use of a buckle or some equivalent device, in combination with the back and hip straps of harness, to which the hip-straps are sewed or otherwise attached, together with loops or some equivalent device sewed or otherwise attached to the back-strap, through which the hip-straps pass and are held in proper position, together with the hip-straps sewed or otherwise attached to the breeching-stays or breeching or breeching-stay rings.

In the annexed drawings I have illustrated my invention.

Figure 1:
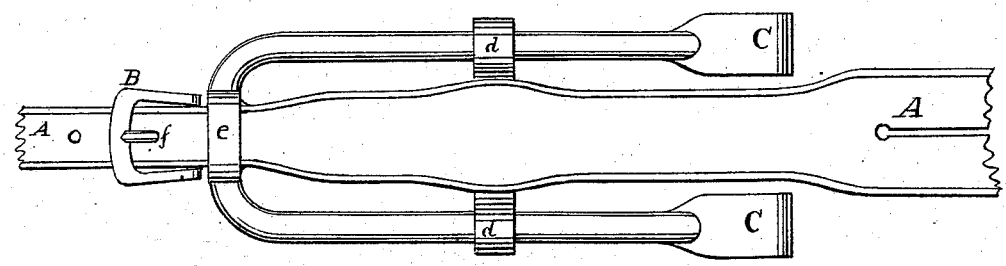
Figure 2:
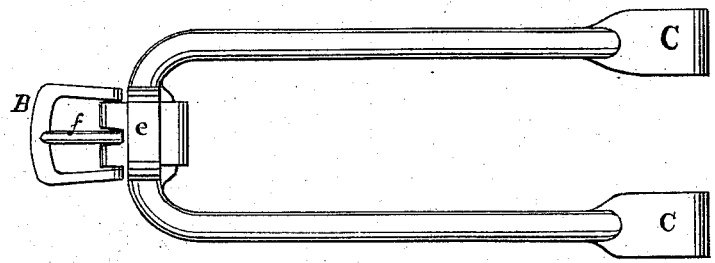

Figure 1 represents my breeching-lifter. Fig. 2 represents a detached portion thereof.

A represents the back-strap of the harness.

B represents the buckle, used in combination with the back-strap A and hip-straps C C, whereby the breeching can be adjusted by the use of one buckle instead of two, one on each hip-strap or breeching-stay strap, as formerly, and can be adjusted while on the horse without passing from side to side of the horse, as formerly.

d d represent the loops, sewed or otherwise attached to the back-strap, through which the hip-straps pass, and by means of which the hip-straps are held in proper position and adapted to fit the hips of different-shaped horses and prevent the hip-straps from passing in front of the horse's hips, and by the assistance of which the breeching is lifted.

C C represent the hip-straps, the lower ends of which are sewed or otherwise attached to the breeching or breeching-strap, thus avoiding the use of the two buckles, breeching-stay straps, buckle strap and loops on the breeching and hip straps, and loose lower ends of hip-straps, which catch the lines, injure the horse by catching and pulling out the hairs of the tail, and by friction removing the hairs from the horse's hips, and avoid other injuries and disadvantages.

What I claim as my invention, and desire to secure by Letters Patent, is—

1. As an improvement in harness, a device for supporting and adjusting the breeching, consisting of the straps C C, a buckle centrally attached thereto and adapted to be attached to the back-strap, all substantially as and for the purpose described.

2. In combination with the back-strap of a harness provided with side loops, d d, the side straps, C C, and buckle B, all constructed and arranged substantially as and for the purpose described.

STEUART F. SMITH.

Witnesses:
F. SIEGEL, Jr.,
JASON W. FIRESTONE.